United States Patent
Wright et al.

(10) Patent No.: US 9,667,702 B1
(45) Date of Patent: May 30, 2017

(54) AUTOMATED DISPATCHING FRAMEWORK FOR GLOBAL NETWORKS

(71) Applicant: Amazon Technologies, Inc., Reno, NV (US)

(72) Inventors: Gary Norris Wright, Issaquah, WA (US); Jacques Joshua Richard, Edmonds, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 743 days.

(21) Appl. No.: 14/032,563

(22) Filed: Sep. 20, 2013

(51) Int. Cl.
*G06F 15/16* (2006.01)
*H04L 29/08* (2006.01)
*H04L 12/24* (2006.01)

(52) U.S. Cl.
CPC .......... *H04L 67/10* (2013.01); *H04L 41/0803* (2013.01)

(58) Field of Classification Search
CPC .................................................. H04L 41/0803
USPC ........................................................ 709/201
See application file for complete search history.

(56) References Cited

U.S. PATENT DOCUMENTS

| | | | |
|---|---|---|---|
| 6,950,868 B1* | 9/2005 | Faraldo, II | H04L 12/2602 709/223 |
| 7,013,467 B1* | 3/2006 | McLain, Jr. | G06F 9/4843 719/320 |
| 7,478,151 B1* | 1/2009 | Maiocco | H04L 43/08 709/223 |
| 2004/0019656 A1* | 1/2004 | Smith | H04L 29/06 709/217 |
| 2004/0230979 A1* | 11/2004 | Beecroft | G06F 13/387 718/100 |
| 2006/0176816 A1* | 8/2006 | Roy | H04L 12/4641 370/235 |
| 2008/0040427 A1* | 2/2008 | Shroff | G06Q 10/10 709/204 |
| 2008/0096531 A1* | 4/2008 | McQuaide | H04L 12/58 455/412.1 |
| 2010/0118742 A1* | 5/2010 | Ezell | H04M 3/42323 370/261 |
| 2010/0240980 A1* | 9/2010 | Zhu | A61B 5/0022 600/372 |
| 2011/0116385 A1* | 5/2011 | Turlington | H04L 12/4633 370/242 |
| 2012/0166628 A1* | 6/2012 | Kullos | H04L 41/5016 709/224 |
| 2012/0192016 A1* | 7/2012 | Gotesdyner | H04L 12/6418 714/47.3 |
| 2012/0192196 A1* | 7/2012 | Yasuda | G06Q 10/10 718/103 |
| 2013/0179486 A1* | 7/2013 | Lee | H04L 67/10 709/201 |

(Continued)

*Primary Examiner* — Hamza Algibhah
(74) *Attorney, Agent, or Firm* — Thomas | Horstemeyer, LLP (57) ABSTRACT

Disclosed are various embodiments that provide an automated dispatching framework for global networks. Monitoring services in private networks monitor networking devices in the private networks. Events are reported by the monitoring services by storing the events in a queue in a global network. A network support management service retrieves the status updates from the queue. Support actions are implemented by the network support management service based at least in part on the status updates.

20 Claims, 6 Drawing Sheets

(56) References Cited

U.S. PATENT DOCUMENTS

| | | | | |
|---|---|---|---|---|
| 2013/0218588 A1* | 8/2013 | Kehr | .................... | A61B 5/4839 |
| | | | | 705/2 |
| 2013/0339454 A1* | 12/2013 | Walker | .................... | H04L 51/04 |
| | | | | 709/206 |
| 2014/0006600 A1* | 1/2014 | Hong | ...................... | G06F 9/542 |
| | | | | 709/224 |
| 2014/0108868 A1* | 4/2014 | Neerincx | ............ | G06F 11/0709 |
| | | | | 714/39 |
| 2014/0188729 A1* | 7/2014 | Hong | ................. | H04L 12/1895 |
| | | | | 705/44 |
| 2014/0215609 A1* | 7/2014 | Fukami | ............... | H04L 63/1408 |
| | | | | 726/22 |

\* cited by examiner

AUTOMATED DISPATCHING FRAMEWORK FOR GLOBAL NETWORKS

BACKGROUND

Conditions of data communications networks are rarely static. Network equipment may fail, potentially resulting in downtime. Network configurations may be unable to handle an unexpected change in conditions, such as a flurry of requests for a content item that has "gone viral." Malicious activity such as denial-of-service attacks may bring down portions of networks. In order to resolve issues such as these, network administrators may have to log into the affected network equipment, execute diagnostic tools, and perform configuration changes.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to an automated dispatching framework for global networks. Enterprise networks increasingly may span multiple geographic regions and even continents. Despite being operated by or on behalf of an enterprise or other organization, such regional networks are unlikely to have a unified network infrastructure. In fact, it may be the case that two or more of such regional networks use an incompatible private network address allocation. Thus, it may be that devices coupled to the enterprise network in one region are unable to communicate directly with devices coupled to the enterprise network in another region. In such a case, communication between the regions may traverse the public Internet, with proxies or network address translation gateways being employed.

Network administration tasks may become laborious in such networking arrangements. Network administrators may have to manually log into gateways in each of the regions in order to perform network diagnostics and configuration. Because the regional networks are logically separated, network administration tools executed in one region are not easily able to communicate with equipment in another region.

Various embodiments of the present disclosure introduce an automated dispatching framework for global networks having multiple regions or fabrics. In the automated dispatching framework, globally accessible queues and/or other data storage services are employed to facilitate communication between a global administration server and network bastion servers in the multiple regions. Commands may be propagated through the network bastion servers to the affected network equipment, while status events and diagnostic information relating to the equipment may be relayed back to the global administration server. The global administration server may be in communication with a trouble ticket system to marshal manual support in some cases.

Figure 1:
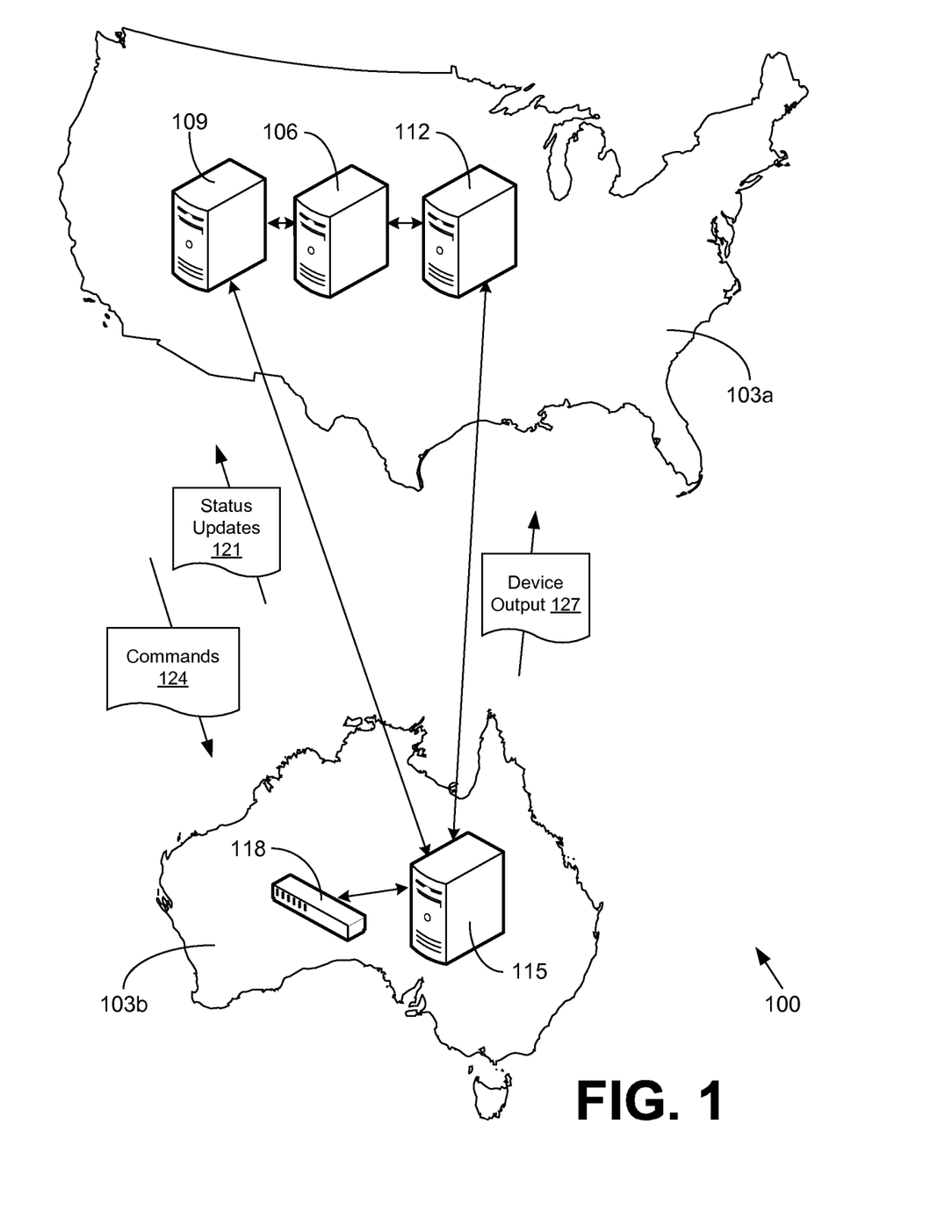
FIG. 1 is a drawing illustrating an example scenario involving two network regions according to various embodiments.

With reference to FIG. 1, shown is an example scenario 100 involving two network regions 103a and 103b according to various embodiments. The network region 103a corresponds to the United States mainland and includes at least three servers: a network support management server 106, a queue server 109, and a storage server 112. These servers may be in a private network or a public network. However, the queue server 109 and the storage server 112 have publicly accessible network addresses, rather than private network addresses.

The network region 103b corresponds to the Australian continent and includes a bastion server 115 and a networking device 118. The networking device 118 may be a router, a switch, a firewall, a bridge, or another type of networking device 118. The networking device 118 is within a private network, and in particular, the networking device 118 is not directly accessible to the network support management server 106. Nonetheless, the networking device 118 is directly accessible to the bastion server 115.

In operation, the bastion server 115 polls the networking device 118 or otherwise receives updates regarding the status of the networking device 118. For example, the updates may indicate that a port of the networking device 118 has failed. Based upon the information collected from the networking device 118, the bastion server 115 provides status updates 121 to the network support management server 106 by storing the status updates 121 in a queue provided by the queue server 109. The status updates 121 may correspond to a port failure in this example. The network support management server 106 polls the queue for such status updates 121 and determines whether to perform an automated action based upon the status updates 121. It is understood that the status updates 121 may correspond to events generated in the bastion server 115 from status updates 121 reported by the networking device 118.

If the network support management server 106 decides to perform an automated action, the network support management server 106 stores one or more administration commands 124 in the queue provided by the queue server 109. The commands 124 may be directed at bypassing the failed port in this example. The bastion server 115 polls the queue for such commands 124. Upon receiving such commands 124, the bastion server 115 executes the commands 124 on the networking device 118 via one or more interactive shell commands, simple network management protocol (SNMP), or other approaches. For example, the commands 124 may be aimed at redirecting network traffic to a different port of the networking device 118. In some cases, the commands 124 may be executed in networking devices 118 that are different from the networking device 118 that originated the status update 121. In one implementation, the bastion server 115 may receive a relatively simple command 124 from the queue, and in response to the command 124, execute multiple different commands 124 from an automated runbook on one or more networking devices 118.

In response, the networking device 118 may provide output to the bastion server 115. The bastion server 115 captures this device output 127 and forwards it to a storage server 112 that has a publicly accessible network address. In this example, the device output 127 may provide confirmation or other output that the configuration changes associated with bypassing the failed port have taken effect successfully. The network support management server 106 thereupon reads the device output 127 from the storage server 112. The network support management server 106 may perform various actions in response to the device output 127, such as creating, escalating, or otherwise updating a support ticket for manual review by a network administrator or performing other automated actions. In the following discussion, a general description of the system and its components is provided, followed by a discussion of the operation of the same.

Figure 2:
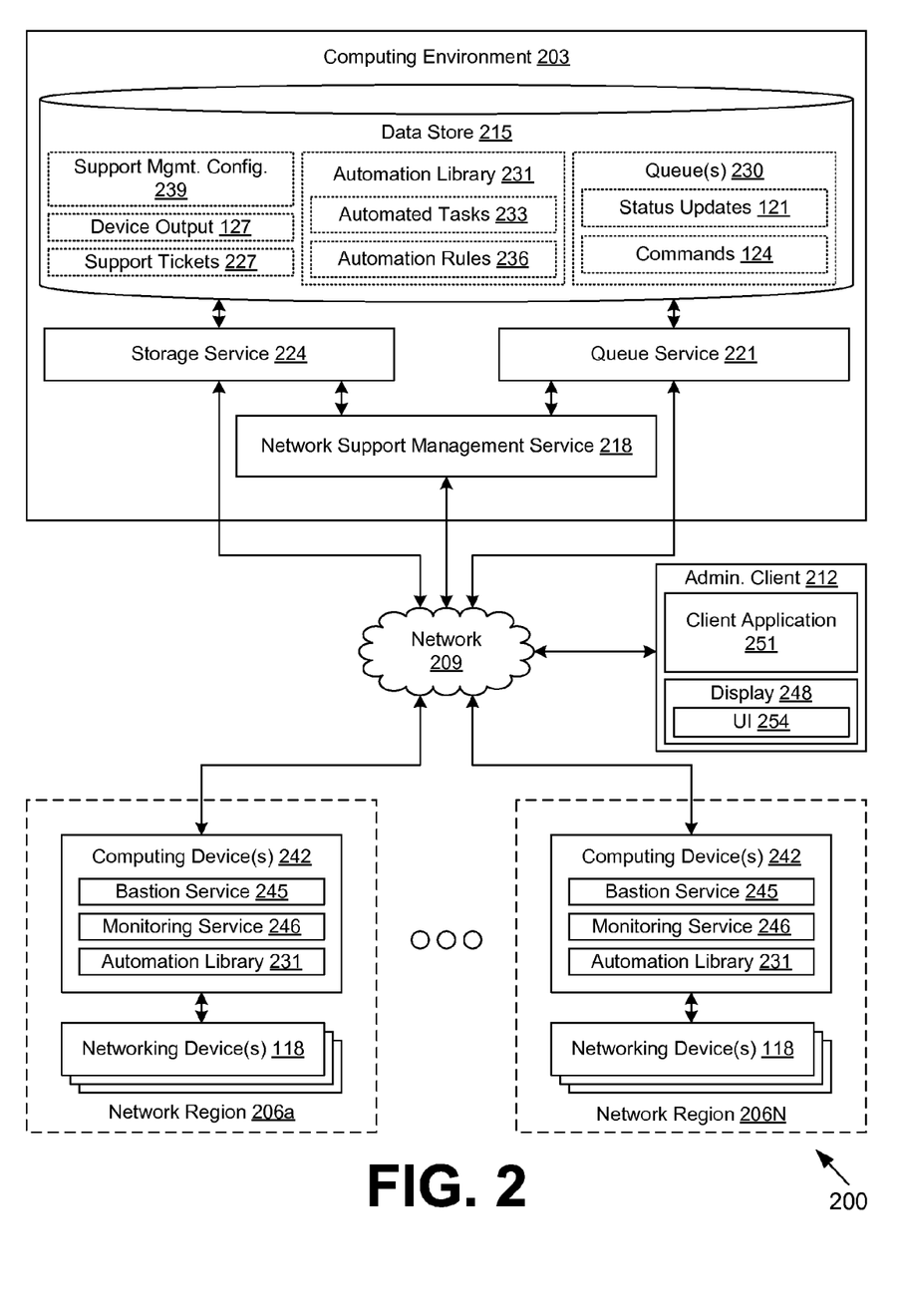
FIG. 2 is a drawing of a networked environment according to various embodiments of the present disclosure.

Turning now to FIG. 2, shown is a networked environment 200 according to various embodiments. The networked environment 200 may correspond to a global network of an organization that spans multiple regions, such as cities, states, regions, countries, and continents. One or more of the regions may correspond to logical regions that may overlap a geographic area. Such logical regions may be separated due to fault tolerance, security requirements, and/or other characteristics. The networked environment 200 includes a computing environment 203 and a plurality of network regions 206a . . . 206N in data communication via a network 209. An administrator client 212 may also be in data communication with the computing environment 203 via the network 209. The network 209 includes, for example, the Internet, intranets, extranets, wide area networks (WANs), local area networks (LANs), wired networks, wireless networks, or other suitable networks, etc., or any combination of two or more such networks.

The computing environment 203 may comprise, for example, a server computer or any other system providing computing capability. Alternatively, the computing environment 203 may employ a plurality of computing devices that are arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 215 that is accessible to the computing environment 203. The data store 215 may be representative of a plurality of data stores 215 as can be appreciated. The data stored in the data store 215, for example, is associated with the operation of the various applications and/or functional entities described below.

The components executed in the computing environment 203, for example, include a network support management service 218, a queue service 221, and a storage service 224, and other applications, services, processes, systems, engines, or functionality not discussed in detail herein. The network support management service 218 is executed to administer various networking devices 118 within the networked environment 200. The network support management service 218 corresponds to the network support management server 106 described in the example of FIG. 1. To this end, the network support management service 218 is configured to receive status information reported by bastion servers 115 (FIG. 1) in each of the network regions 206. The network support management service 218 is also configured to initiate various diagnostic and/or configuration commands 124 for the networking devices 118. Such commands 124 may be initiated automatically and/or manually via a web portal or other interface. The network support management service 218 includes a support ticket system to manage support tickets 227 for networking devices 118 in the networked environment 200.

The queue service 221 manages one or more queues 230 in the data store 215. In one implementation, the queue service 221 may provide a message queue service for relatively short messages (e.g., up to 64 kilobytes in size or some other maximum size). The queue service 221 may be assigned a publicly accessible network address (e.g., a public internet protocol (IP) address on the global Internet). Messages in the queues 230 may be stored in multiple data stores 215 for redundancy and to assure availability. In one implementation, the queue service 221 may guarantee at-least-once delivery but not in-order delivery. The queue service 221 may provide authentication procedures for security and may facilitate encryption of data. In some cases, the queue service 221 may be operated by a third-party organization on a utility computing basis.

The storage service 224 facilitates storage of device output 127 and/or other data within the data store 215. Compared to the queue service 221, the storage service 224 may facilitate storage of larger quantities of data. Thus, it may be desirable for the device output 127, which has potentially unbounded size, to be stored by the storage service 224 rather than by the queue service 221. The storage service 224 may provide authentication procedures for security and may facilitate encryption of data. In some cases, the storage service 224 may be operated by a third-party organization on a utility computing basis.

The data stored in the data store 215 includes, for example, device output 127, queues 230, support tickets 227, an automation library 231 comprising automated tasks 233 and automation rules 236, support management configuration 239, and potentially other data. The device output 127 may correspond to diagnostic and/or configuration output generated by the networking devices 118 in response to commands 124. Access to the device output 127 may be managed by the storage service 224. The queues 230 are maintained by the queue service 221 to provide storage of status updates 121, commands 124, and/or other messages. In one implementation, multiple queues 230 are provided, with each corresponding to different priorities.

The support tickets 227 may describe events in the networked environment 200 for which a resolution is desired. Such events may include service failure, hardware failure, decreased network performance, and so on. Support tickets 227 may be automatically created by the network support management service 218 or manually created through user reporting or network administrator reporting. Support tickets 227 may be resolved automatically via the network support management service 218 and/or manually by an administrative user to whom the support ticket 227 is assigned. The support tickets 227 may each be assigned a respective priority or severity level. The support tickets 227 may be escalated (i.e., assigned a greater priority) or deescalated (i.e., assigned a lesser priority) in response to events or user intervention.

An automation library 231 including automated tasks 233 and automation rules 236 may be provided. The automation library 231 may correspond to a common library employed both in the computing environment 203 and in the bastion servers 115 as will be discussed. The automation library 231 may be updated from time to time as administrative users contribute changes. Such updates may be pushed to other installations of the automation library 231. In one implementation, an updated automation library 231 may be tested within a testing networked environment 200 before being pushed to a production networked environment 200. Various services discussed herein may be restarted in response to an updated automation library 231 being deployed.

Automated tasks 233 correspond to various tasks that may be performed by the network support management service 218 in response to detected events. The automated tasks 233 may provide an automated resolution of a type of network problem or issue. For example, an automated task 233 may correspond to an automated runbook, or a compilation of various commands 124 to be issued in order to troubleshoot and/or correct a condition in the networked environment 200. In one example, an automated task 233 may include a number of commands 124, where successive commands 124 are conditional upon the device output 127 resulting from preceding commands 124. An automated task 233 may be designed to automatically resolve an issue and/or gather information to facilitate manual resolution of the issue. Various versions of automated tasks 233 may be provided for different models and/or deployments of networking devices 118.

The automation rules 236 correspond to rules that control the selection of automated tasks 233 in response to various events. The selection may depend on the particular manufacturer, model, etc. of the networking device 118. Further, the automation rules 236 may include various thresholds for comparison of values in events, e.g., events corresponding to status updates 121. The automation rules 236 may control creation, update, escalation, de-escalation, and/or other actions relative to support tickets 227. The support management configuration 239 may configure the operation of the network support management service 218 with respect to the various network regions 206, bastion servers 115, networking devices 118, and/or other features of the networked environment 200.

Each of the network regions 206 may correspond to a separate private network within the networked environment 200. In one implementation, two or more of the network regions 206 may use mutually exclusive private network address allocations. For example, two network regions 206 may separately use the private network of "10.0.0.0/8." In such cases, two different devices in different network regions 206 may employ the same network address (e.g., "10.1.1.254"). An implication of such an arrangement may be that devices in different network regions 206 may not be directly accessible to one another. Communication may be facilitated via respective gateways to and from the network regions 206 that perform network address translation, port address translation, IP masquerading, proxying, firewalling, and/or other gateway functions. In various implementations, networking device configuration traffic may be unroutable outside of the respective network region 206.

Each of the network regions 206 may include one or more computing devices 242 in data communication with one or more networking devices 118. Each computing device 242 may comprise, for example, a server computer or any other system providing computing capability. Alternatively, a plurality of computing devices 242 may be employed that are arranged, for example, in one or more server banks or computer banks or other arrangements. For example, a plurality of computing devices 242 together may comprise a hosted computing resource, a grid computing resource, and/or any other distributed computing arrangement. Such computing devices 242 may be located in a single installation or may be distributed among many different geographical locations. For purposes of convenience, the computing device 242 is referred to herein in the singular. Even though the computing device 242 is referred to in the singular, it is understood that a plurality of computing devices 242 may be employed in the various arrangements as described above.

The computing device 242 may correspond to the bastion server 115 represented in the example of FIG. 1. Various applications and/or other functionality may be executed in the computing device 242 according to various embodiments. The components executed on the computing device 242, for example, include a bastion service 245, a monitoring service 246, an automation library 231, and other applications, services, processes, systems, engines, or functionality not discussed in detail herein. The bastion service 245 is configured to execute commands 124, obtain device output 127 in response to the commands 124, and/or perform other functions on behalf of the network support management service 218. It is noted that there may be multiple computing devices 242 and corresponding bastion services 245 within a given network region 206. However, in one deployment, a single bastion service 245 is active at a given time.

The monitoring service 246 is executed to interface with the networking devices 118 in the respective network region 206 in order to obtain status updates 121, perform normalization, filtering, and/or aggregation on the status updates 121, and report events to the bastion service 245 and/or the network support management service 218 by way of the queue service 221. To this end, the monitoring service 246 may include a network alarm aggregation system. In one implementation, the networking devices 118 may be configured to report status updates 121 via a system logging function. In such an implementation, the monitoring service 246 may obtain the status updates 121 via the system logging function rather than directly from the networking devices.

The automation library 231 may correspond to a copy of the automation library 231 employed in the computing environment 203. The automation library 231 may be employed to trigger automation executed in the bastion service 245 and/or to interface with commands 124 sent by the network support management service 218.

The administrator client 212 is representative of a plurality of client devices that may be coupled to the network 209. The administrator client 212 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The administrator client 212 may include a display 248. The display 248 may comprise, for example, one or more devices such as liquid crystal display (LCD) displays, gas plasma-based flat panel displays, organic light emitting diode (OLED) displays, electrophoretic ink (E Ink) displays, LCD projectors, or other types of display devices, etc.

The administrator client 212 may be configured to execute various applications such as a client application 251 and/or other applications. The client application 251 may be executed in an administrator client 212 for example, to access network content served up by the computing environment 203 and/or other servers, thereby rendering a user interface 254 on the display 248. The client application 251 may, for example, correspond to a browser, a mobile application, etc., and the user interface 254 may correspond to a network page, a mobile application screen, etc. The administrator client 212 may be configured to execute applications beyond the client application 251 such as, for example, browsers, mobile applications, email applications, social networking applications, and/or other applications.

Next, a general description of the operation of the various components of the networked environment 200 is provided. To begin, respective monitoring services 246 and bastion services 245 are configured in each of the multiple network regions 206. The monitoring services 246 monitor the networking devices 118 in the network region 206 (and/or monitor system logging recorded from the networking devices 118) and store events or status updates 121 in queues 230 via the queue service 221. The bastion services 245 and/or the monitoring service 246 may be permitted to communicate with the administrative layers of the networking devices 118 due to configuration via access controls of the networking devices 118. The bastion services 245 also poll queues 230 via the queue service 221 to determine commands 124 to be executed in the networking devices 118. The bastion services 245 execute such commands 124 and capture the device output 127.

The bastion services 245 store the captured device output 127 in the data store 215 by way of the storage service 224. It is noted that the storage service 224 and the queue service 221 may be accessible by the bastion services 245 via respective public network addresses through the network 209. The bastion services 245 may be authenticated and encryption may be employed in order to secure communication between the bastion services 245 and the storage service 224 and the queue service 221.

It is noted that the network support management service 218 may not be directly accessible by the bastion service 245 and vice versa. The network support management service 218 is configured to poll the queues 230 for status updates 121 or events and to execute automated tasks 233 in response to the status updates 121. Such automated tasks 233 may include various commands 124 to be issued. Commands 124 that are issued are stored in the queue service 221 for consumption by the respective bastion service 245. To this end, the commands 124 may include bastion service identifiers and/or networking device identifiers. Alternatively, the network support management service 218 may place the commands 124 in bastion service-specific queues 230. The network support management service 218 may read and process the device output 127 resulting from such commands 124 via the storage service 224.

In some implementations, functions of the network support management service 218 may be pushed to the bastion services 245. For example, the bastion services 245 may be configured to process the status updates 121 or events and issue the commands 124 directly according to automated tasks 233 and automation rules 236 of the automation library 231.

Based upon the results of such automated processing, the network support management service 218 may create and/or update support tickets 227 for manual review by network administrators. The network support management service 218 may provide a web portal, mobile portal, dashboard, or other service whereby the administrator clients 212 may log in, view the status of the networked environment 200, view or modify support tickets 227, view status updates 121 or events, manually issue commands 124, view the device output 127, and/or perform other functions. To this end, the network support management service 218 may include a commercially available hypertext transfer protocol (HTTP) server such as Apache® HTTP Server, Apache® Tomcat®, Microsoft® Internet Information Services (IIS), and/or other servers.

Although the computing devices 242 and networking devices 118 are described as being in a different network region 206 from the computing environment 203, in one base-case example, a computing device 242 may be deployed in the computing environment 203 in order to monitor networking devices 118 of the same network region 206 as the network support management service 218.

Figure 3A:
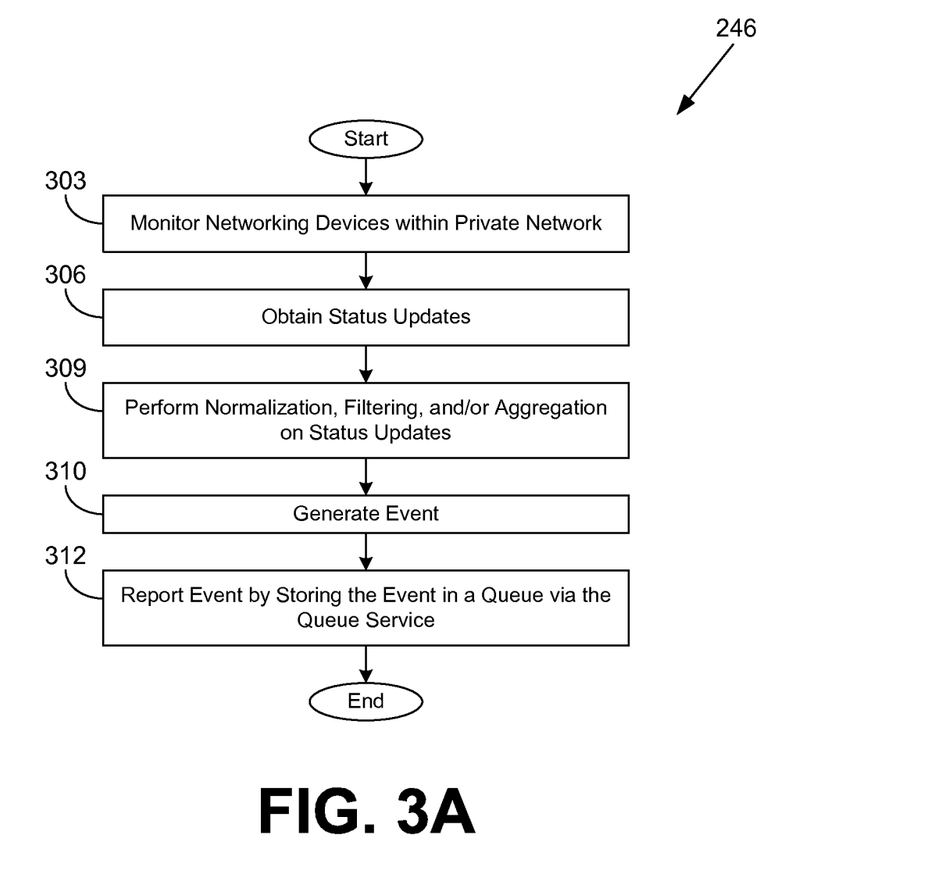
FIG. 3A is a flowchart illustrating one example of functionality implemented as portions of a monitoring service executed in a computing device in the networked environment of FIG. 2 according to various embodiments of the present disclosure.

Referring next to FIG. 3A, shown is a flowchart that provides one example of the operation of a portion of the monitoring service 246 according to various embodiments. It is understood that the flowchart of FIG. 3A provides merely an example of the many different types of functional arrangements that may be employed to implement the operation of the portion of the monitoring service 246 as described herein. As an alternative, the flowchart of FIG. 3A may be viewed as depicting an example of steps of a method implemented in the computing environment 203 (FIG. 2) according to one or more embodiments.

Beginning with box 303, the monitoring service 246 monitors one or more networking devices 118 (FIG. 2) within the private network of the network region 206 (FIG. 2). For example, the monitoring service 246 may poll the networking device 118 via a proprietary application programming interface (API), via simple network management protocol (SNMP), or another approach. Alternatively, the monitoring service 246 may register as a listener with the networking device 118 for certain events, and the networking device 118 may be configured to push those events to the monitoring service 246. In some cases, the monitoring service 246 may communicate with intermediate devices (e.g., syslog systems) that obtain and process information from the networking devices 118.

In box 306, the monitoring service 246 obtains status updates 121 (FIG. 2). In box 309, the monitoring service 246 performs normalization, filtering and/or aggregation functions on the status updates 121. For example, some status updates 121 may be relatively frequent in occurrence and/or insignificant and may safely be ignored. Some status updates 121 may be grouped with other status updates 121 in order to perform an aggregation. In box 310, an event is generated by the monitoring service 246 from the status updates 121. As a non-limiting example, a grouping of status updates 121 that correspond to very high network latency may result in a network down event being generated. In box 312, the monitoring service 246 reports the event by storing the event in a queue 230 (FIG. 2) via the queue service 221 (FIG. 2).

In other implementations, the status updates 121 may be reported by the monitoring service 246 via the queue service 221.

In one implementation, the queue service 221 may be accessible by the monitoring service 246 by way of a publicly accessible network address. The monitoring service 246 may select the particular queue 230 from a plurality of such queues 230 according to a level of importance of the status update 121. In some implementations, the monitoring service 246 may be configured to automatically issue commands 124 (FIG. 2) to the networking devices 118 based at least in part on the status update 121. Thereafter, the portion of the monitoring service 246 ends.

Figure 3B:
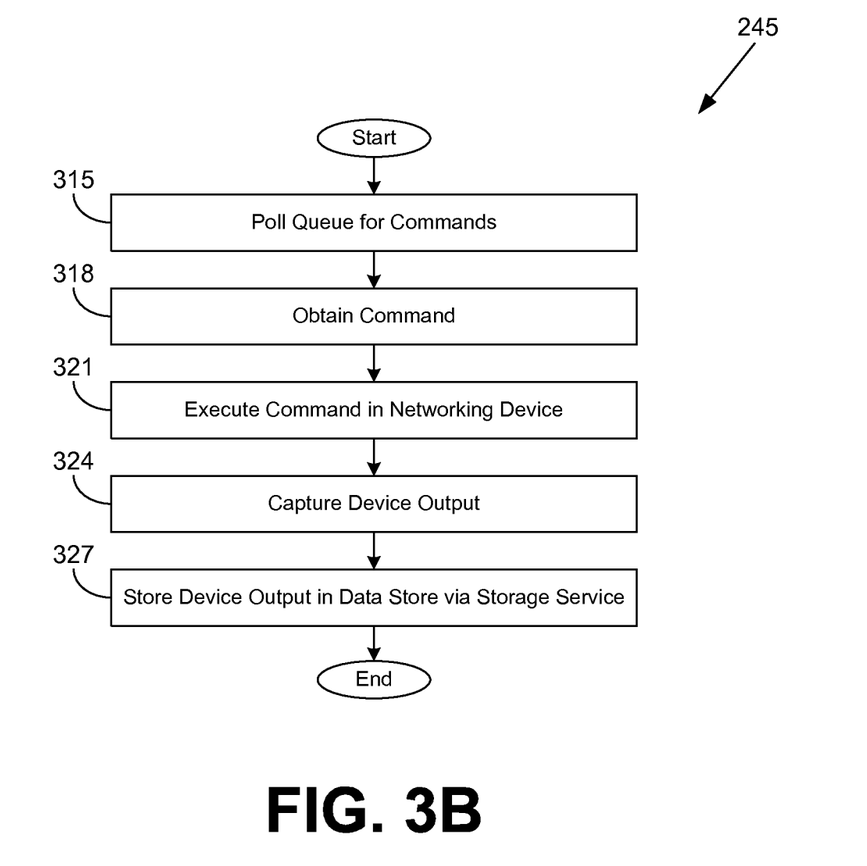
FIG. 3B is a flowchart illustrating one example of functionality implemented as portions of a bastion service executed in a computing device in the networked environment of FIG. 2 according to various embodiments of the present disclosure.

Moving on to FIG. 3B, shown is a flowchart that provides one example of the operation of a portion of the bastion service 245 according to various embodiments. It is understood that the flowchart of FIG. 3B provides merely an example of the many different types of functional arrangements that may be employed to implement the operation of the portion of the bastion service 245 as described herein. As an alternative, the flowchart of FIG. 3B may be viewed as depicting an example of steps of a method implemented in the computing environment 203 (FIG. 2) according to one or more embodiments.

Beginning with box 315, the bastion service 245 polls one or more queues 230 (FIG. 2) for commands 124 (FIG. 2) via the queue service 221 (FIG. 2). In box 318, the bastion service 245 obtains a command 124 via the queue service 221. In one implementation, the command 124 may specify a decision tree for a plurality of commands 124 for an automated runbook. In box 321, the bastion service 245 executes the command 124 in one or more networking devices 118 (FIG. 2). For example, the bastion service 245 may log into the networking device 118 via secure shell (SSH) and automatically enter various textual commands via an interactive mode. In another example, the bastion service 245 may execute a command via an application programming interface (API). In box 324, the bastion service 245 captures the device output 127 (FIG. 2). For example, as a result of a diagnostic command 124, the networking device 118 may output a table of various parameters or statistics. In box 327, the bastion service 245 stores the device output 127 in the data store 215 (FIG. 2) via the storage service 224 (FIG. 2). Thereafter, the portion of the bastion service 245 ends.

Figure 4:
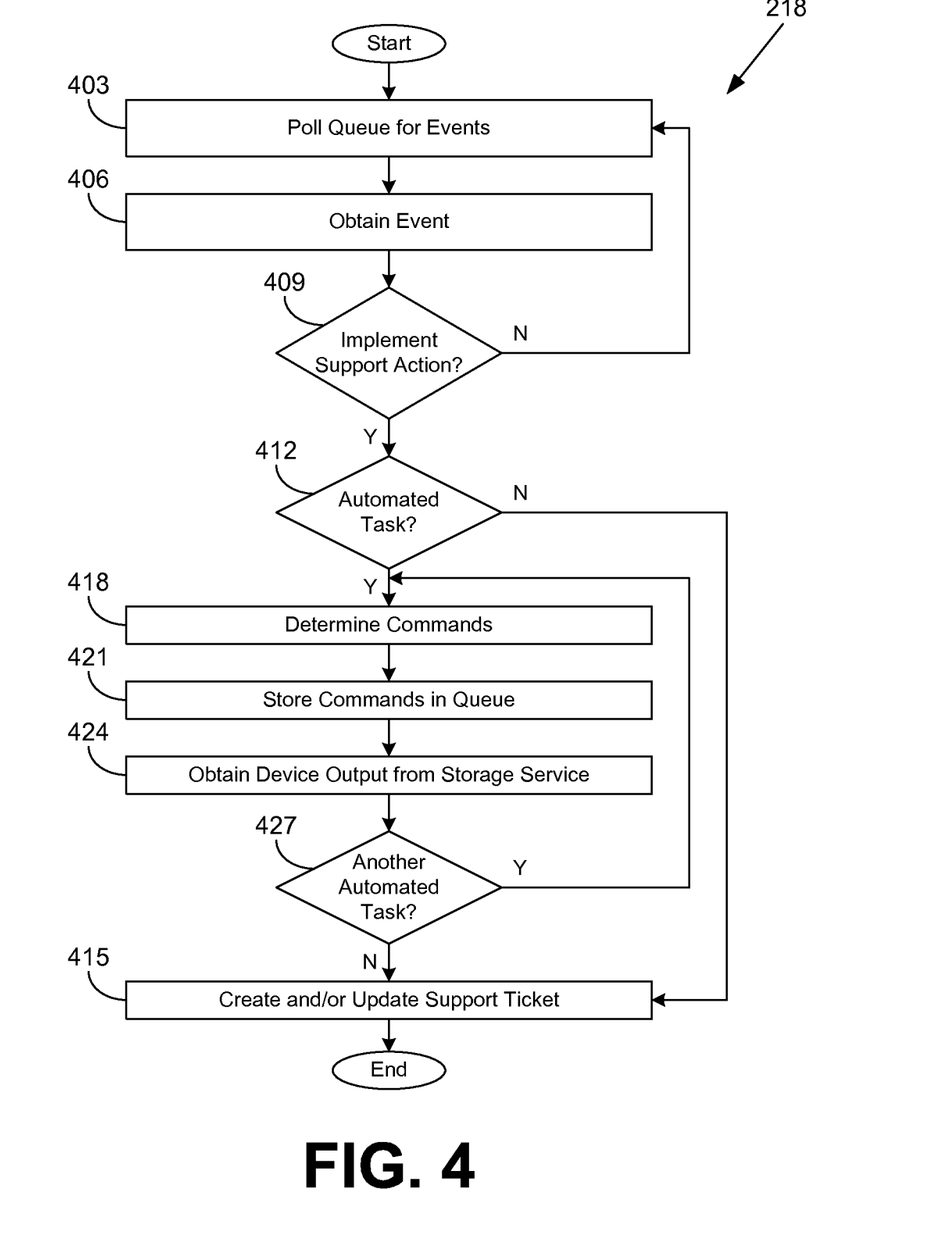
FIG. 4 is a flowchart illustrating one example of functionality implemented as portions of a network support management service executed in a computing environment in the networked environment of FIG. 2 according to various embodiments of the present disclosure.

Continuing to FIG. 4, shown is a flowchart that provides one example of the operation of a portion of the network support management service 218 according to various embodiments. It is understood that the flowchart of FIG. 4 provides merely an example of the many different types of functional arrangements that may be employed to implement the operation of the portion of the network support management service 218 as described herein. As an alternative, the flowchart of FIG. 4 may be viewed as depicting an example of steps of a method implemented in the computing environment 203 (FIG. 2) according to one or more embodiments.

Beginning with box 403, the network support management service 218 polls one or more queues 230 (FIG. 2) for events via the queue service 221 (FIG. 2). In one implementation, multiple queues 230 may be employed, each being associated with differing levels of importance. Thus, the multiple queues 230 may collectively implement a priority queue. Accordingly, the network support management service 218 is able to select a high priority event from a high priority queue 230 even while numerous other events may be awaiting processing in a low priority queue 230. The network support management service 218 obtains an event in box 406.

In box 409, the network support management service 218 determines whether to implement a support action in response to the obtained event. If not, the network support management service 218 returns to box 403 and continues to poll for further events. If a support action is to be implemented, the network support management service 218 continues from box 409 to box 412.

In box 412, the network support management service 218 determines, based at least in part on the automation rules 236 (FIG. 2), whether to perform an automated task 233 (FIG. 2) in response to the obtained event. If no automated task 233 is to be performed, the network support management service 218 moves to box 415. In box 415, the network support management service 218 creates and/or updates a support ticket 227 (FIG. 2) for manual review. Thereafter, the portion of the network support management service 218 ends.

If, instead, the network support management service 218 determines that an automated task 233 is to be performed, the network support management service 218 moves from box 412 to box 418. In box 418, the network support management service 218 determines one or more administration commands 124 (FIG. 2) to be issued that are associated with the particular automated task 233. In box 421, the network support management service 218 stores the commands 124 in a queue 230 via the queue service 221. The queue 230 is monitored by a corresponding bastion service 245 (FIG. 2).

In box 424, the network support management service 218 may obtain device output 127 (FIG. 2) from the command(s) 124 via the storage service 224 (FIG. 2). In box 427, the network support management service 218 determines whether to perform another automated task 233 based, for example, on the device output 127 and/or the automation rules 236. For example, the device output 127 may indicate a failure of the previous command 124, which may indicate another command 124 may be employed or that the issue may need to be manually resolved. If another automated task 233 is to be performed, the network support management service 218 returns to box 418 and determines subsequent commands 124 to be issued. In other implementations, if another automated task 233 is to be performed, the network support management service 218 may return to another flow entry point, such as box 406. If another automated task 233 is not to be performed, the network support management service 218 moves to box 415. In box 415, the network support management service 218 creates and/or updates a support ticket 227. Thereafter, the portion of the network support management service 218 ends.

Although FIG. 4 is described with reference to the network support management service 218, it is understood that the bastion service 245 (FIG. 2) may be configured in some cases to implement automated tasks 233 separately or independently from commands 124 issued by the network support management service 218. For example, in one implementation, a bastion service 245 may receive events and/or status updates 121 from a monitoring service 246 and may independently implement various automated tasks 233 in response to certain events.

Figure 5:
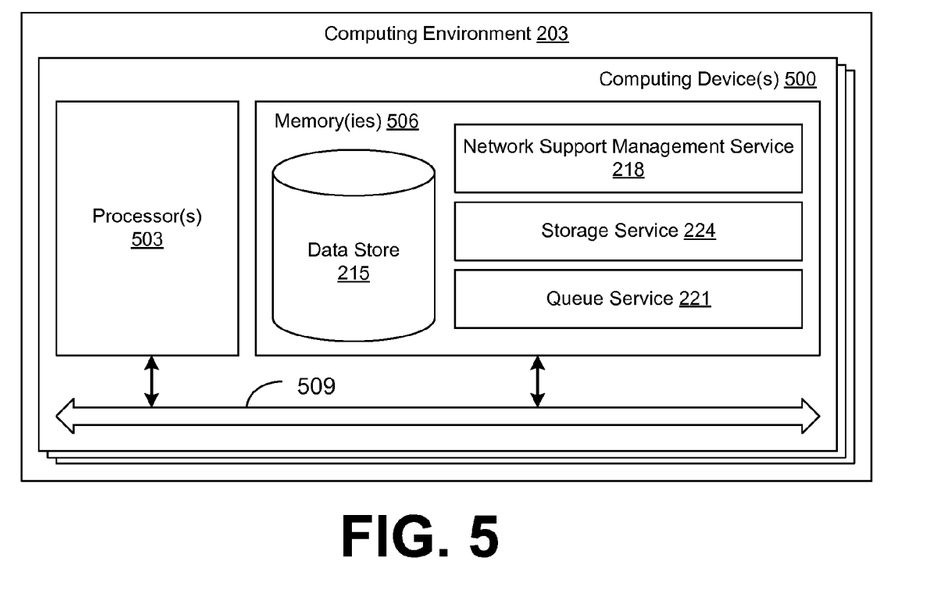
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 203 according to an embodiment of the present disclosure. The computing environment 203 includes one or more computing devices 500.

Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the network support management service 218, the queue service 221, the storage service 224, and potentially other applications. Also stored in the memory 506 may be a data store 215 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the network support management service 218, the queue service 221, the storage service 224, the bastion service 245 (FIG. 2), the monitoring service 246 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3A-4 show the functionality and operation of an implementation of portions of the bastion service 245, the monitoring service 246, and the network support management service 218. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3A-4 show a specific order of execution, it is understood that the order of execution may differ from that which is depicted. For example, the order of execution of two or more blocks may be scrambled relative to the order shown. Also, two or more blocks shown in succession in FIGS. 3A-4 may be executed concurrently or with partial concurrence. Further, in some embodiments, one or more of the blocks shown in FIGS. 3A-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network support management service 218, the queue service 221, the storage service 224, and the bastion service 245, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
  a plurality of computing devices, individual ones of the computing devices being deployed in respective ones of a plurality of private networks associated with a single organization, at least some of the plurality of private networks employing mutually exclusive network address allocations;
  a plurality of networking devices in the plurality of private networks; and
  individual ones of the computing devices being configured to at least:
    monitor respective ones of the plurality of networking devices in the respective ones of the plurality of private networks;
    report respective events for the respective ones of the plurality of networking devices by storing the respective events in a priority queue in a publicly addressed network, the priority queue comprising a plurality of queues, and the respective events being stored in a first queue of the plurality of queues;
    automatically read administration commands from a second queue of the plurality of queues of the priority queue and execute the administration commands in the respective ones of the plurality of networking devices; and
    receive respective responses from the respective ones of the plurality of networking devices and store the respective responses in a data store in the publicly addressed network, the data store and the priority queue being stored separately.

2. The system of claim 1, further comprising a network support management computing device configured to:
  retrieve the respective events from the priority queue;
  issue the administration commands to the respective ones of the plurality of networking devices by storing the administration commands in the priority queue;
  receive the respective responses to the administration commands via the data store; and
  create or update at least one support ticket based at least in part on the respective responses.

3. The system of claim 1, wherein at least some of the plurality of private networks exist on different continents.

4. A system, comprising:
  a first computing device in a first network;
  a second computing device in a second network;
  a networking device in the second network;
  a queue and a data store accessible to the first network and the second network;
  a network support management service executable in the first computing device, wherein, when executed, the network support management service causes the first computing device to at least:
    issue an administration command to the networking device by storing the administration command in the queue; and
    receive a response to the administration command via the data store; and
  a bastion service executable in the second computing device, wherein, when executed, the bastion service causes the second computing device to at least:
    automatically read the administration command from the queue and execute the administration command in the networking device; and
    receive the response from the networking device and store the response in the data store.

5. The system of claim 4, wherein the networking device is not directly accessible to the network support management service.

6. The system of claim 4, wherein the first network and the second network are in different regions.

7. The system of claim 6, wherein the different regions employ mutually exclusive network address spaces.

8. The system of claim 4, wherein, when executed, the network support management service further causes the first computing device to at least create or update a support ticket based at least in part on the response.

9. The system of claim 4, wherein the queue and the data store correspond to distinct data storage services.

10. The system of claim 4, wherein the queue and the data store are assigned public network addresses.

11. The system of claim 4, wherein the queue comprises a plurality of queues that collectively implement a priority queue.

12. The system of claim 4, wherein the administration command comprises a diagnostic command or a configuration command.

13. The system of claim 4, wherein the administration command comprises a predefined plurality of interactive shell commands selected to accomplish a specific task in the networking device.

14. The system of claim 4, further comprising a plurality of second computing devices in a plurality of second networks, and respective bastion services executable in individual ones of the plurality of second computing devices.

15. A method, comprising:

monitoring, by a monitoring service executed in a first at least one computing device in a private network, a networking device in the private network;

reporting, by the monitoring service, a status event for the networking device by storing the status event in a queue in a global network;

retrieving, by a network support management service executed in a second at least one computing device, the status event from the queue, the networking device being not directly accessible by the network support management service; and implementing, by the network support management service, a support action based at least in part on the status event.

16. The method of claim 15, wherein the queue comprises a plurality of queues, the method further comprising:

determining, by the monitoring service, a level of importance associated with the status event;

selecting, by the monitoring service, one of the plurality of queues based at least in part on the level of importance; and wherein reporting the status event further comprises storing the status event in the selected one of the plurality of queues.

17. The method of claim 15, wherein implementing the support action further comprises automatically creating a support ticket for an issue with the networking device identified via the status event.

18. The method of claim 15, wherein implementing the support action further comprises:

selecting an automated resolution of an issue with the networking device identified via the status event; and initiating the automated resolution.

19. The method of claim 18, wherein initiating the automated resolution further comprises storing, by the network support management service, an administration command in the queue.

20. The method of claim 19, further comprising:

retrieving, by a bastion service executed in the first at least one computing device, the administration command from the queue; and executing, by the bastion service, a plurality of interactive shell commands in the networking device in response to the administration command.

* * * * *